United States Patent [19]

Ishikawa et al.

[11] Patent Number: 4,647,195
[45] Date of Patent: Mar. 3, 1987

[54] AUTOMOTIVE HEADLAMP TESTING METHOD AND APPARATUS

[75] Inventors: Soichi Ishikawa, Nagoya; Mamoru Yoshida; Kunio Kozawa, both of Toyota, all of Japan

[73] Assignee: Toyota Jidosha Kabushiki Kaisha, Aichi, Japan

[21] Appl. No.: 631,780

[22] Filed: Jul. 17, 1984

[51] Int. Cl.⁴ .............................................. G01J 1/00
[52] U.S. Cl. ..................................... 356/121; 356/154
[58] Field of Search .............................. 356/121, 154

[56] References Cited

U.S. PATENT DOCUMENTS 3,077,139  7/1958  Todd et al. ........................ 356/121

FOREIGN PATENT DOCUMENTS

| 0004590 | 1/1978 | Japan | 356/121 |
| 26042 | 3/1978 | Japan . | |
| 0030884 | 5/1979 | Japan | 356/121 |
| 64634 | 6/1981 | Japan . | |
| 0111432 | 7/1982 | Japan | 356/121 |
| 111430 | 7/1982 | Japan . | |
| 111431 | 7/1982 | Japan . | |
| 0156531 | 9/1982 | Japan | 356/121 |
| 0179639 | 11/1982 | Japan | 356/121 |
| 2723123 | 1/1978 | Netherlands | 356/121 |
| 2060932 | 4/1981 | United Kingdom | 356/121 |

Primary Examiner—R. A. Rosenberger
Assistant Examiner—Crystal D. Cooper
Attorney, Agent, or Firm—Parkhurst & Oliff

[57] ABSTRACT

A headlamp testing method of the invention involves the steps of applying the low beam of the headlamp onto a screen, determining the position of the geometrical center of a closed area of illuminance higher than a predetermined level, determining the position of a cut off line cross point from the position of the geometrical center and a predetermined amount of offset, and determining a presumption line cut off line from the cut off line cross point. The presumption line thus determined is displayed together with a mark which indicates the within which the cross point should fall, and the headlamp beam is judged as being acceptable when the cross point is located within this range.

10 Claims, 8 Drawing Figures

AUTOMOTIVE HEADLAMP TESTING METHOD AND APPARATUS

BACKGROUND OF THE INVENTION

The present invention relates to an automotive headlamp testing method and apparatus for testing the headlamp beam axis, particularly the low beam axis of the headlamps of an automobile on an automobile assembly line.

Generally, in an inspection section annexed to an automobile assembling line, a headlamp test is conducted to check whether the headlamp beam is oriented correctly. As shown in FIG. 1, this headlamp test is conducted by applying the low beam of the headlamp to a screen 11 which is positioned ahead of the automobile on the assembling line and has a reference or standard mark 15 and checking whether the boundary line 12 referred to as "cut off line" hereunder between the dark area 13 and the bright area 14 of the low beam is aligned with the standard mark 15 on the screen 11. If the cut off line 12 fails to be so aligned, the headlamp beam axis is adjusted to bring the cut off line 12 into alignment with the standard mark 15.

This conventional headlamp testing method, however, encounters the following problems.

Namely, it is not easy to visually check the alignment of the headlamp beam axis because the cut off line 12 does not actually appear so distinctively as shown in FIG. 1. Checking is difficult and the checking accuracy is low particularly in the case where one assembling line is used for the assembly of a plurality of types of automobiles, because in such a case a plurality of standard marks 15, corresponding to different types of automobiles, are concentrated in a limited area on the screen 11.

For the same reasons, the adjustment of the headlamp beam axis is difficult and cannot be conducted with sufficient accuracy.

SUMMARY OF THE INVENTION

Accordingly, an object of the invention is to provide an improved automotive headlamp testing method and apparatus which allows a higher degree of accuracy in the adjustment of the headlamp beam axis.

The invention makes use of a certain positional relationship existing between the geometrical center 23 of the brightest zone 22 (referred to as "hot zone") and the cross point 21 of the cut off line 20 of the low beam applied to the screen as illustrated in FIG. 2.

Basically, the headlamp testing method of the invention involves the steps of applying the low beam of the headlamp onto a screen and determining the position of the geometrical center of a closed area of illuminance. The closed area has a higher than a predetermined level of illuminance. The position of a cut off line cross point based on the position of the geometrical center and a predetermined amount of offset. The predetermined amount of offset is preset in the memory. A presumption line of cut off line is then determined from the cut off line cross point. The presumption line of the cut off line thus determined is displayed together with a mark which indicates the inspection limit (i.e. allowable range within which the cut off line cross point should fall), and the headlamp beam is judged as being acceptable when the cut off line cross point is located within the mark.

The above and other objects, features and advantages of the invention will become clear from the following description of the preferred embodiments taken in conjunction with the accompanying drawings.

DESCRIPTION OF THE PREFERRED EMBODIMENTS

Figure 3:
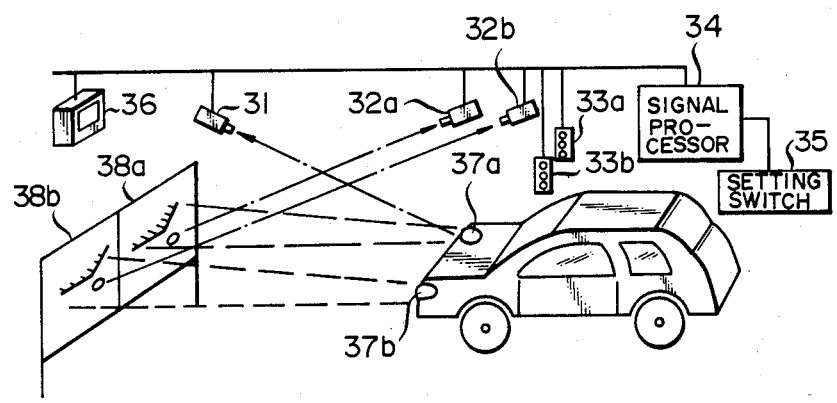
FIG. 3 shows the general arrangement of an apparatus of the invention for examining the beam axis of an automotive headlamp.

FIG. 3 shows the general arrangement of an apparatus embodying the invention for examining the automotive headlamp beam axis. This apparatus has a vehicle height measuring TV camera 31 adapted to directly take up the image of the light from a headlamp 37a (or 37b), and TV cameras 32a and 32b for taking up the image of light patterns of low beams applied by the headlamps 37a and 37b to a screen 38a for the right headlamp and a screen 38b for the left headlamp. These TV cameras 31,32a and 32b hang from the ceiling so as not to hinder the movement of the vehicle under examination along the assembling line. The apparatus further has a signal processor 34 which processes video signals from the TV cameras 31,32a and 32b. More specifically, the signal processor 34 produces various signals corresponding to a mark representing the inspection limit or allowable range for alignment of headlamp beam axis of the automobile under examination, a symbol representing the geometrical center of the hot zone of the light beam, a symbol representing the cut off line cross point and a presumption line of cut off line. These signals are inputted to a monitor TV 36 so that the mark of the inspection limit, the symbol representing the geometrical center of the hot zone, the symbol representing the cross point and the cut off line presumption line of cut off line are displayed on the monitor TV 36.

Figure 4:
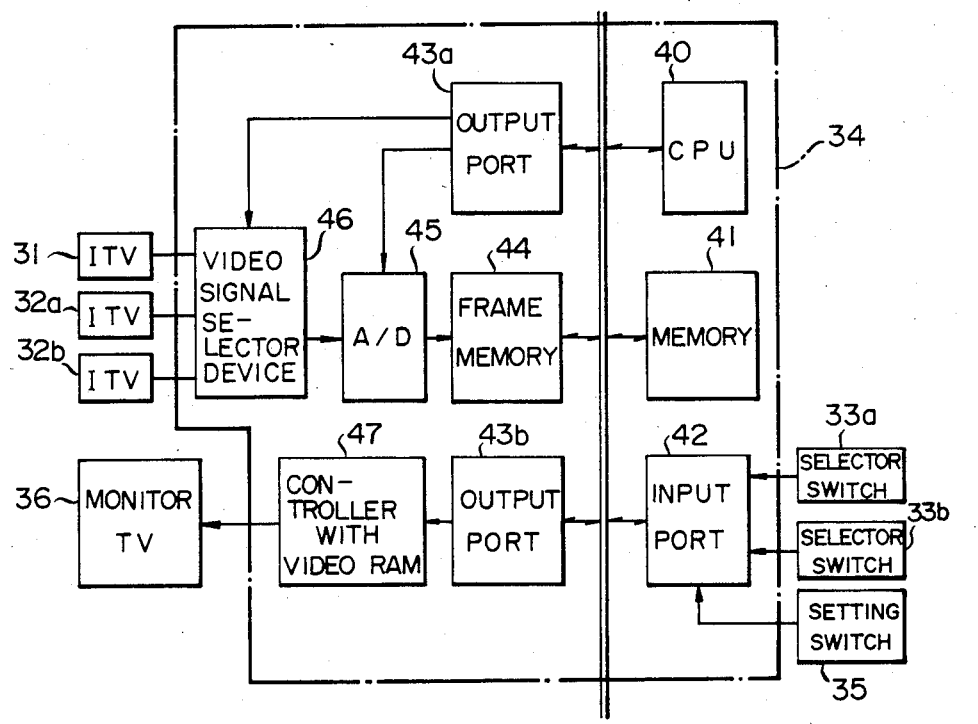
FIG. 4 is a block diagram showing the practical arrangement of a signal processor 34 incorporated in the apparatus as shown in FIG. 3.

Reference numerals 33a and 33b, FIGS. 3 and 4, denote selector switches for appointing the type of the automobile to be examined. These switches 33a and 33b hang from a right portion and a left portion of the ceiling across the working passages. When the switch 33a for the right headlamp is operated, a central processing unit 40, FIG. 4, (referred to as CPU hereinunder) judges that the right headlamp is to be examined. On the other hand, when the switch 33b is operated, the CPU 40 judges that the left headlamp is to be examined. A reference numeral 35 designates a setting switch for inputting various items of information such as the size and position of the mark of inspection limit on the monitor TV picture screen, corresponding to each type of automobile to be examined, coordinate information concerning the cross point which will be mentioned later, and reference vehicle height for each type of automobile.

A practical example of the image signal processor 34 will be described hereinunder with reference to FIG. 4. The TV cameras 31, 32a and 32b are connected to a video signal selector device 46 which is adapted to select one out of the video signals from these TV cameras 31, 32a and 32b. The output from the video signal selector device 46 is connected to the input side of the analog-to-digital converter 45 (referred to as "A/D converter", hereinunder), so that the video signal which has passed the video signal selector device 46 is binarily coded at a quantizing level determined beforehand by the A/D converter 45. The output side of the A/D converter 45 is connected to the input side of a frame memory 44 so that the binarily-coded picture signal is stored in the frame memory 44. The quantization causes the fact that, in the frame memory 41, picture elements being "0" level corresponds to the area having illuminance less than the predetermined illuminance, while picture elements being "1" level corresponds to the area having illuminance higher than the predetermined level. The CPU 40 executes various computations in accordance with the examination program stored in the memory 41. The memory 41 beforehand stores the values Rj of standard heights of lamp centers of different types of automobile, as well as the picture information showing the marks representing the inspection limits for respective types of automobile. Thus, different sizes of the mark are used for different types of automobile. When the cut off line cross point falls within the area defined by the mark, the headlamp beam axis is accepted as being aligned correctly.

Figure 7:
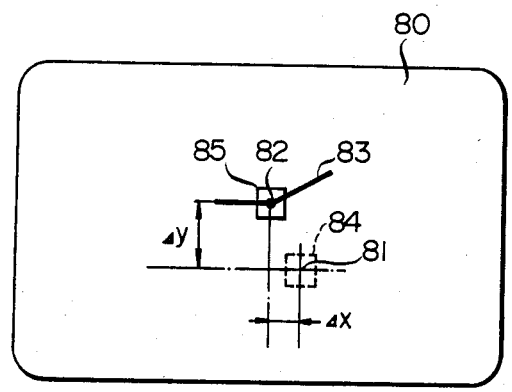
FIG. 7 is an illustration of the positional relationship between the mark representing the inspection limit, cut off line cross point, presumption line of cut off line and the geometrical center of hot zone, all of which are displayed on a monitor TV through the image processing in accordance with the illustrated embodiment.

The memory 41 stores also the position of the cut off line cross point, in the form of offsets $\Delta x$ and $\Delta y$ in the X and Y directions from the position of the geometrical center of the hot zone in the low-beam light distribution pattern, as will be seen from FIG. 7. The distances $\Delta x$ and $\Delta y$ are called predetermined amounts of offset. Picture information concerning the presumption line of cut off line referred to in the above summary of the invention is also stored beforehand in the memory 41.

A reference numeral 42 designates an input port through which the output signals from the automobile-type selector switches 33a,33b and the setting switch 35 are inputted, while numerals 43a and 43b denote output ports. A reference numeral 47 designates a controller for converting the picture signal coming from the output port 43b into a video signal. The input port 42, output ports 43a,43b, controller 47 and the video signal selector device 46 constitute an input/output interface of the signal processor 34.

Figure 5:
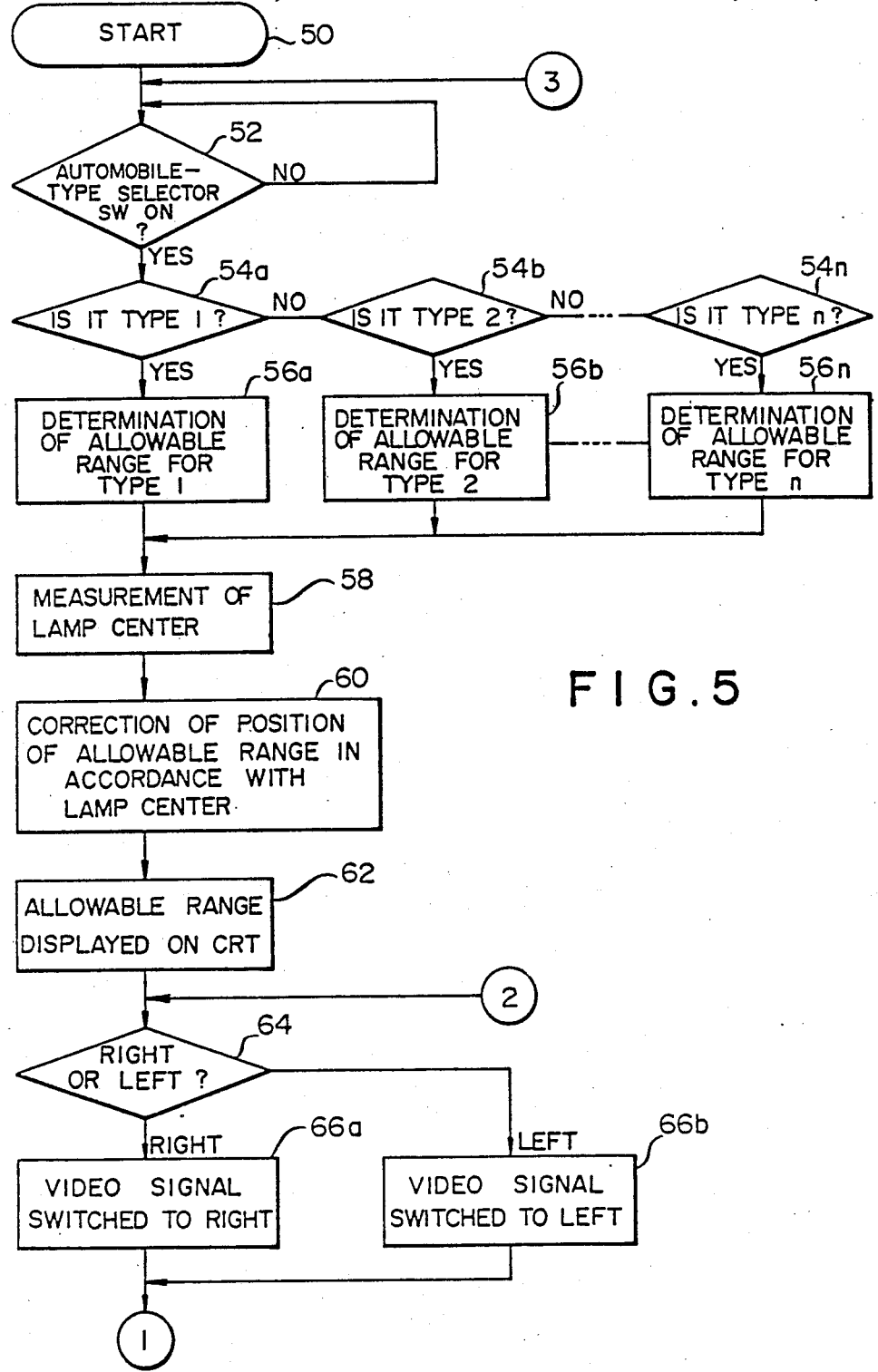
FIGS. 5 and 6 are flow charts showing the contents of processing of signals in the signal processor 34.
Figure 6:
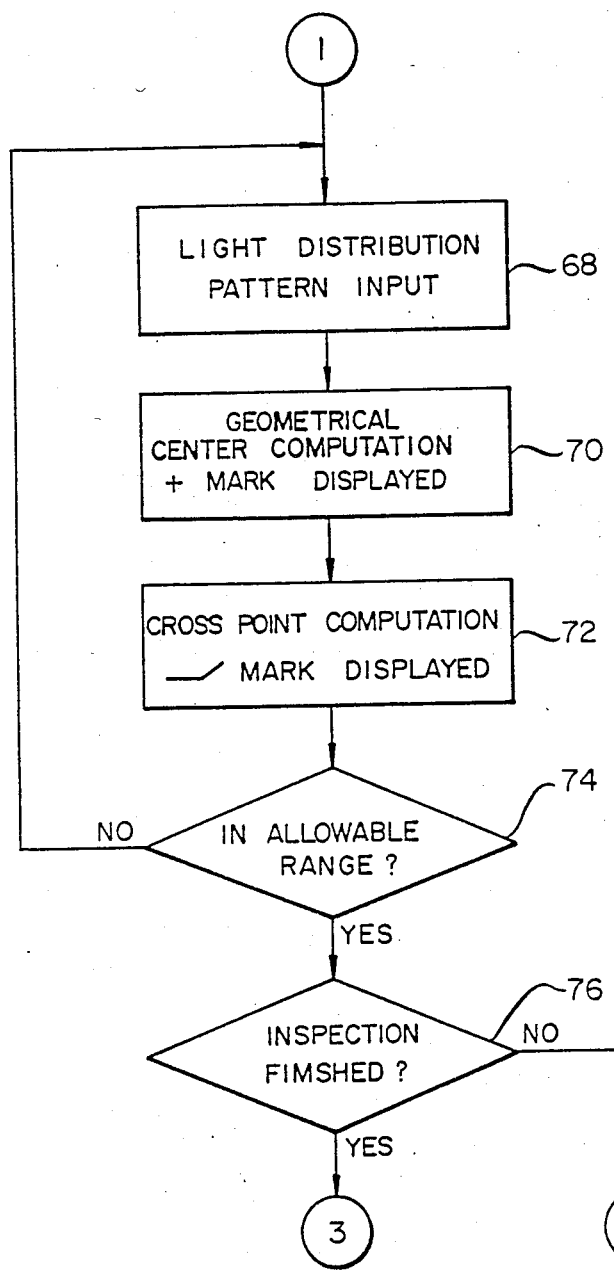

The operation of the signal processor 34 will be explained hereinunder with reference to FIGS. 5 and 6 showing the flow charts of operation. Referring first to FIG. 5, as the examination program is started at the step 50, a judgement is made in the next step 52 as to whether the automobile-type selector switch 33a (or 33b) is in the "ON" state. More specifically, when the automobile has reached the designated position in front of the screens 38a,38b on the examination line, the inspector presses the automobile-type selection switch 33a (or 33b), so that the answer "Yes" is given in the step 52 mentioned above, and the procees then proceeds to the steps 54a to 54n. However, when the answer in the step 52 is "No", the same operation is repeated, until the answer "Yes" is obtained. In the steps 54a to 54n, a judgement is made to identify the type of the automobile to be examined in accordance with the automobile-type selection signal from the switch 33a (or 33b). Then, in the steps 56a to 56n, the inspection limit or allowable range corresponding to the identified type of automobile is read out of the memory 41 which stores various inspection limits corresponding to various automobile types inputted thereto beforehand through the setting switch 35.

Figure 8:
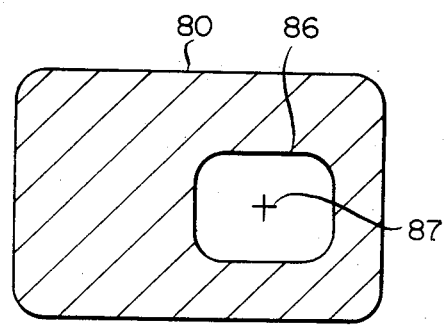
FIG. 8 is an illustration of a closed area of illuminance higher than a predetermined level of illuminance and the geometrical center of this area, as observed when the headlamp beam directly applied to a vehicle height measuring TV camera is quantized.

In a step 58, in order to determine the height of lamp center of the automobile to be examined, the video signal selector device 46 is switched to take-up the video signal of the headlamp beam directly received through the TV camera 31. This video signal is then quantized by the A/D converter 45 into binary code, and the thus binary-coded picture information is temporarily stored in the frame memory 44. As a result of this quantization, a closed area 86 of illumination intensity higher than a predetermined level is obtained as shown in FIG. 8. In other words, the closed curved area 86 is bounded by the line indicative of the same illumination intensity. Then, by determining the position of the geometrical center 87 of the closed area 86, it is possible to obtain the data concerning the height of lamp center of the automobile.

Using the thus stored picture information concerning the direct beam from the headlamp, the lamp center of the automobile is determined in the following manner. The addresses in the frame memory are represented by (i,j). The picture element Pij in the white state is expressed by Pij=1, while the picture element Pij in the black state is expessed by Pij=0. With this assumption, the geometrical center position (Gx,Gy) is expressed by the following formula (1)

$$(Gx,Gy) = \left( \frac{\Sigma\Sigma i \cdot Pij}{\Sigma\Sigma Pij} \quad \frac{\Sigma\Sigma j \cdot Pij}{Pij} \right) \quad (1)$$

where, Gx represents the position of the geometrical center on the X-axis, while Gy represents the geometrical center position on the Y-axis. Consequently, the coordinate value Gy represents the height of lamp center of the automobile. Therefore, representing the value corresponding to the standard height by Rj, the error or deviation E of the actual height from the standard height is given by $|Gy-Rj|$.

In a step 60, the position of the mark on the monitor TV picture, read out in the steps 56a to 56n and representing the inspection limit, is adjusted vertically in accordance with the error E.

Figure 1:
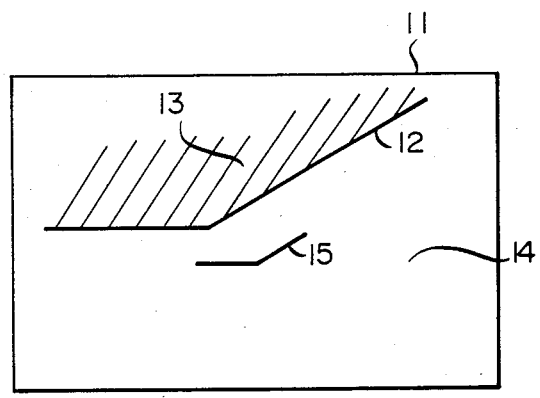
FIG. 1 is an illustration showing the positional relationship between the light pattern of a low beam applied to a screen and a standard mark on the screen of a conventional headlamp testing apparatus.
Figure 2:
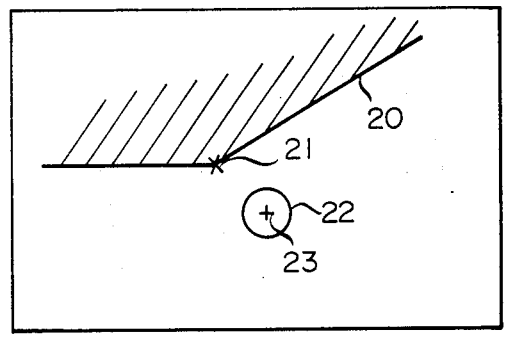
FIG. 2 is an illustration of the positional relationship between the cut off line and the hot zone in the low beam light pattern as shown in FIG. 1.

In a step 62, as shown in FIG. 7, the mark 85 representing the inspection limit of beam axis alignment is displayed on the picture of the monitor TV 36. In a step 64, a judgement is made as to which one of the automobile-type selector switches 33a (for the right headlamp) and 33b (for the left headlamp) has been turned on. If it is judged that the switch 33a has been turned on, the video signal selector device 46 is switched in a step 66a to receive the video signal from the TV camera 32a for the right headlamp. On the other hand, if it is judged that the switch 33b has been turned on, the video signal selector device 46 is switched to receive the video signal from the TV camera for the left headlamp. Then, in a step 68 shown in FIG. 6, the image of the light of low beam on the screen, taken up by the TV camera 32a or 32b, is quantized by the A/D converter 45 at a predetermined level of quantization, and the thus quantized value is taken into a predetermined area of the frame memory 44 as the light distribution pattern. The frame memory 44 has different memory areas corresponding to respective TV cameras 31,32a and 32b. The quantization level employed in the described process is so selected as to determine an area corresponding to the hot zone 22 (see FIG. 2) on the screen.

In a step 70, the position (Gx,Gy) of the geometrical center of the hot zone of the light distribution pattern is determined on the basis of the states, i.e. white or black state, of the picture elements stored in the memory areas for respective TV cameras 32a,32b preserved in the frame memory 45. The determination of the geometrical center position (Gx,Gy) is conducted substantially in the same manner as the process for determining the height of lamp center explained before. Then, as shown in FIG. 7, a mark 81 is displayed on the monitor TV 36 at the thus determined position (Gx,Gy) of the geometrical center.

In a step 72, the sharp-cut cross point is computed using the values representing the geometrical center position determined in the step 70 and the amounts Δx and Δy stored for respective types of automobile. Then, the presumption line of cut off line is determined on the basis of the thus determined cross point. The cut off line cross point 82 and the presumption line of cut off line 83 are displayed on the monitor TV 36 as shown in FIG. 7.

The inspector then visually checks whether the cut off line cross point 82 falls within the inspection limit 85. If the cross point 82 does not fall within the inspection limit 85, the headlamp beam axis is adjusted until the cross point 82 comes to fall within the inspection limit 85.

If the headlamp beam alignment falling within the inspection limit 85 is confirmed, an affirmative judgement is made in a step 74 and the process proceeds to a step 76. However, if the headlamp beam axis alignment does not fall within the inspection limit, the steps 68 to 72 are taken repeatedly. In the step 76, a judgement is made as to whether the examination or adjustment of both the left and right headlamp beams has been completed. If the answer is "No", i.e., if it is found that the examination or adjustment of beam axis of either one headlamp has not been made yet, the steps 64 to 74 are taken repeatedly and, after completion of beam axes of both headlamps, the process proceeds to the next step 52 to prepare for the examination of headlamps of the next automobile.

It is possible to display the inspection limit 84 of the position of the geometrical center 81 of the hot zone on the monitor TV, as shown by the broken line in FIG. 7.

Although the invention has been described through specific terms, it is to be noted that the described embodiment is not exclusive and various changes and modifications may be imparted thereto without departing from the scope of the invention which is limited solely by the appended claims.

What is claimed is:

1. A headlamp testing method for examining a low beam axis alignment of a headlamp of an automobile comprising the steps of:
    taking up an image of light distribution pattern of a low beam from a headlamp applied to a screen;
    determining a position of a geometrical center of a closed area of illuminance, said closed area having a higher level of illuminance than a predetermined level of illuminance in said light distribution pattern;
    determining a position of a cut off line cross point from the determined geometrical center position and from predetermined amounts of offset;
    determining a presumption line of the cut off line on the basis of the determined cut off line cross point; and
    displaying an image of the determined presumption line and an inspection limit within which said cross point should fall, whereby when said cross point is within said inspection limit said headlamp is properly aligned.

2. A headlamp testing method according to claim 1, further comprising the steps of: measuring a height of the lamp center of automobile to be examined; and correcting the position of said mark in accordance with the result of measurement of the height.

3. A headlamp testing method according to claim 2, wherein said step of correcting the position of the mark of inspection limit includes the steps of:
    taking up a second image of the headlamp beam directly applied by the headlamp:
    determining a second position of a second geometrical center of a second closed area of illuminance higher than a predetermined level of illuminance in a picture of the second taken-up image;
    comparing said second position of the second geometrical center with a predetermined standard value of the height of lamp center; and
    correcting the position of said mark in accordance with the result of the comparison.

4. A headlamp testing apparatus for examining a low beam axis alignment of a headlamp comprising:
    means for taking up an image of a light distribution pattern of a low beam from a headlamp applied a screen to and for producing a video signal;
    means for determining a position of a geometrical center of a closed area of illuminance in accordance with said video signal, said closed area of illuminance having a higher than a predetermined level of illuminance in said light distribution pattern;
    means for determining a position of a cut off line cross point from the determined geometrical center position and from predetermined amounts of offset;
    means for determining a presumption line of said cut off line on the basis of said determined cut off line cross point;
    means for displaying an image of the determined presumption line and an inspection limit within which said cross point should fall, whereby when said cross point is within said inspection limit said headlamp is properly aligned.

5. A headlamp testing apparatus according to claim 4, further comprising means for measuring a height of the lamp of the automobile to be examined; and means for correcting the position of said inspection limit in accordance with the result of said measurement of the height.

6. A headlamp testing apparatus according to claim 5, wherein said means for correcting the position of the inspection limit includes:
- means for taking up a second image of the headlamp beam directly applied by the headlamp;
- means for determining a second position of a second geometrical center of a second closed area of illuminance, said second closed area having higher than a second predetermined level of illuminance, said second determination being from a picture of the taken-up second image;
- means for comparing said second position of the second geometrical center with a predetermined standard value of the height of the lamps center; and
- means for correcting the position of said inspection limit in accordance with the result of the comparison.

7. A headlamp testing apparatus according to claim 4, wherein said means for determining the position of the geometrical center comprises means for quantizing said video signal to store the quantized video signal in a form of "0" and "1" in addresses of memory means and means for calculating the followimg formula to determine said geometrical center $$(Gx, Gy) = \left( \frac{\Sigma\Sigma i \cdot Pij}{\Sigma\Sigma Pij}, \frac{\Sigma\Sigma j \cdot Pij}{\Sigma\Sigma Pij} \right) \quad (1)$$

where; Gx represents the position of the geometrical center on the X-axis, Gy represents the position of the geometrical center on the Y-axis, i and j represent addresses of said memory means, a white state of a picture element is expressed in said memory means by Pij=1 and a black state of the picture element is expressed by Pij=0.

8. A headlamp testing apparatus according to claim 7, further comprising means for measuring a height of the lamp center of the automobile to be examined; and means for correcting the position of said inspection limit in accordance with the result of said measurement of the height.

9. A headlamp testing apparatus according to claim 8, wherein said means for correcting the position of the inspection limit includes:
- means for taking up a second image of the headlamp beam directly applied by the headlamp;
- means for determining a second position of a second geometrical center of a second closed area of illuminance, said second closed area having a higher than a second predetermined level of a illuminance, said second determination being from a second picture of the taken-up image;
- means for comparing said second position of the second geometrical center with a predetermined standard value of the height of lamp center; and
- means for correcting the second position of said inspection limit in accordance with the result of the comparison.

10. A headlamp testing apparatus for examining the beam axis alignment of a headlamp comprising:
- a first TV camera for taking-up an image of a light directly applied by a headlamp and for producing a first video signal;
- at least one second TV camera for taking-up an image of a light distribution pattern of a low beam of said headlamp applied to a screen and for producing a second video signal;
- a monitor TV for displaying an image of a presumption line of a cut off line and an image of a mark representing an inspection limit for a cut off line cross point;
- an analog-to-digital converter connected to said first TV camera and said second TV camera for quantizing said video signals at respective predetermined quantizing levels;
- a frame memory having different storage areas for storing the quantized first and second video signals as pictorial information of said light directly applied by said headlamp and pictorial information of said light distribution pattern, respectively;
- an image processing means connected to said frame memory for determining, from said pictorial information of the light applied directly by said headlamp, a first position of a first geometrical center of a first closed area of illuminance, said first closed area of illuminance having higher than a first predetermined illuminance level;
- determining, from the pictorial information of said light distribution pattern, a second position of a second geometrical center of a second closed area of illuminance, said second closed area having higher than a second predetermined illuminance level;
- correcting a position of said mark representing said inspection limit on said monitor TV in accordance with a difference between the first position of said first geometrical center and a predetermined reference value representing a standard height of the lamp center of the automobile to be examined;
- determining a position of said cut off line cross point on the basis of the second position of said second geometrical center and a predetermined value of offset from the second position of said second geometrical center, said predetermined offset value being predetermined based on the type of automobile to be examined;
- determining said presumption line in accordance with the position of the cross point; and
- a controller for displaying, on said monitor TV, an image of said presumption line determined by said image processing means and an image of said mark corrected by said image processing means.

* * * * *